United States Patent
Benzing, II et al.

(10) Patent No.: US 10,350,945 B2
(45) Date of Patent: *Jul. 16, 2019

(54) BEADLESS NON-PNEUMATIC TIRE WITH GEODESIC PLY

(71) Applicant: The Goodyear Tire & Rubber Company, Akron, OH (US)

(72) Inventors: James Alfred Benzing, II, Canton, OH (US); Daniel Ray Downing, Uniontown, OH (US)

(73) Assignee: The Goodyear Tire & Rubber Company, Akron, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 15/275,753

(22) Filed: Sep. 26, 2016

(65) Prior Publication Data

US 2017/0174003 A1    Jun. 22, 2017

Related U.S. Application Data

(60) Provisional application No. 62/270,763, filed on Dec. 22, 2015.

(51) Int. Cl.
| | | |
|---|---|---|
| *B60C 7/10* | (2006.01) | |
| *B60C 7/14* | (2006.01) | |
| *B60C 7/24* | (2006.01) | |
| *B60C 7/26* | (2006.01) | |
| *B60C 7/00* | (2006.01) | |

(52) U.S. Cl.
CPC ............... *B60C 7/24* (2013.01); *B60C 7/00* (2013.01); *B60C 7/102* (2013.01); *B60C 7/14* (2013.01); *B60C 7/26* (2013.01); *B60C 2007/146* (2013.01)

(58) Field of Classification Search
CPC .... B60C 7/00; B60C 7/10; B60C 7/14; B60C 7/143; B60C 7/24; B60C 7/26; B60C 7/102

See application file for complete search history.

(56) References Cited

U.S. PATENT DOCUMENTS

| | | | |
|---|---|---|---|
| 1,016,991 A * | 2/1912 | Herold ............... | B60C 7/14 |
| | | | 152/268 |
| 1,966,397 A | 7/1934 | Sohl | |
| 3,712,362 A | 1/1973 | Alderfer | |
| 5,050,656 A | 9/1991 | Ho | |
| 5,879,484 A | 3/1999 | Spragg et al. | |
| 6,068,721 A * | 5/2000 | Dyer ............... | B29D 30/36 |
| | | | 152/554 |
| 6,170,544 B1 | 1/2001 | Hottebart | |
| 6,386,258 B1 * | 5/2002 | Dyer ............... | B60C 9/07 |
| | | | 152/542 |

(Continued)

FOREIGN PATENT DOCUMENTS

| | | |
|---|---|---|
| DE | 3640222 C2 | 5/1997 |
| EP | 0853009 A3 | 12/1999 |

(Continued)

OTHER PUBLICATIONS

European Search Report dated May 11, 2017 for Application Serial No. EP16203452.

*Primary Examiner* — Kip T Kotter
(74) *Attorney, Agent, or Firm* — June E. Rickey

(57) ABSTRACT

A structurally supported tire includes a ground contacting annular tread portion, an annular shear band and geodesic ply.

15 Claims, 9 Drawing Sheets

(56) References Cited

U.S. PATENT DOCUMENTS

| | | | |
|---|---|---|---|
| 6,640,859 B1 * | 11/2003 | Laurent | B60C 7/10 |
| | | | 152/246 |
| 6,769,465 B2 | 8/2004 | Rhyne et al. | |
| 7,650,919 B2 | 1/2010 | Rhyne et al. | |
| 8,651,156 B2 | 2/2014 | Fadel et al. | |
| 8,688,421 B2 | 4/2014 | Summers et al. | |
| 2004/0187996 A1 * | 9/2004 | Grah | B60C 1/00 |
| | | | 152/516 |
| 2009/0022921 A1 * | 1/2009 | Meraldi | B29C 70/32 |
| | | | 428/36.4 |
| 2011/0146871 A1 | 6/2011 | Laske | |

FOREIGN PATENT DOCUMENTS

| | | |
|---|---|---|
| FR | 2844479 A1 | 3/2004 |
| FR | 2856635 A1 | 12/2004 |
| GB | 20865 A | 5/1911 |
| GB | 2002699 A | 2/1979 |
| WO | 9854007 A1 | 12/1998 |

* cited by examiner

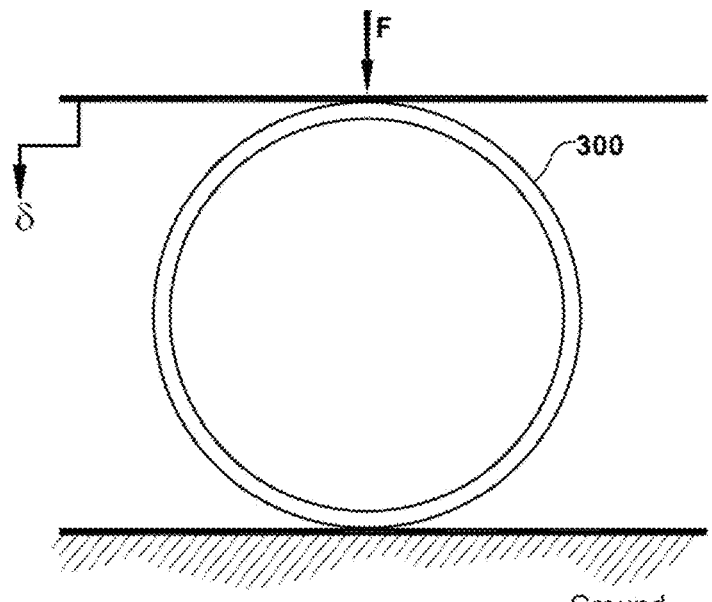
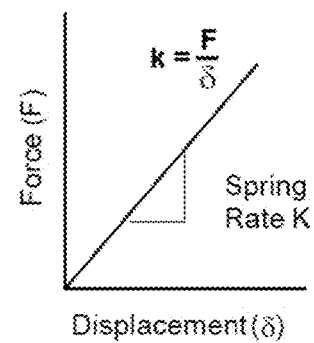
FIG. 11A
FIG. 11B
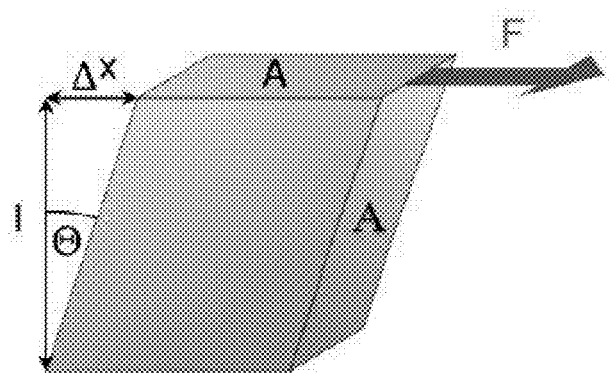
FIG. 12

BEADLESS NON-PNEUMATIC TIRE WITH GEODESIC PLY

FIELD OF THE INVENTION

The present invention relates generally to vehicle tires and non-pneumatic tires, and more particularly, to a non-pneumatic tire.

BACKGROUND OF THE INVENTION

The pneumatic tire has been the solution of choice for vehicular mobility for over a century. The pneumatic tire is a tensile structure. The pneumatic tire has at least four characteristics that make the pneumatic tire so dominate today. Pneumatic tires are efficient at carrying loads, because all of the tire structure is involved in carrying the load. Pneumatic tires are also desirable because they have low contact pressure, resulting in lower wear on roads due to the distribution of the load of the vehicle. Pneumatic tires also have low stiffness, which ensures a comfortable ride in a vehicle. The primary drawback to a pneumatic tire is that it requires compressed fluid. A conventional pneumatic tire is rendered useless after a complete loss of inflation pressure.

A tire designed to operate without inflation pressure may eliminate many of the problems and compromises associated with a pneumatic tire. Neither pressure maintenance nor pressure monitoring is required. Structurally supported tires such as solid tires or other elastomeric structures to date have not provided the levels of performance required from a conventional pneumatic tire. A structurally supported tire solution that delivers pneumatic tire-like performance would be a desirous improvement.

Non pneumatic tires are typically defined by their load carrying efficiency. "Bottom loaders" are essentially rigid structures that carry a majority of the load in the portion of the structure below the hub. "Top loaders" are designed so that all of the structure is involved in carrying the load. Top loaders thus have a higher load carrying efficiency than bottom loaders, allowing a design that has less mass.

Thus an improved non pneumatic tire is desired that has all the features of the pneumatic tires without the drawback of the need for air inflation is desired.

BRIEF DESCRIPTION OF THE DRAWINGS

The present invention will be better understood through reference to the following description and the appended drawings, in which:

FIG. 11a illustrates a spring rate test for a shear band, while FIG. 11b illustrates the spring rate k determined from the slope of the force displacement curve.

FIG. 12 is the deflection measurement on a shear band from a force F.

DEFINITIONS

The following terms are defined as follows for this description.

"Equatorial Plane" means a plane perpendicular to the axis of rotation of the tire passing through the centerline of the tire.

"Meridian Plane" means a plane parallel to the axis of rotation of the tire and extending radially outward from said axis.

"Hysteresis" means the dynamic loss tangent measured at 10 percent dynamic shear strain and at 25° C.

DETAILED DESCRIPTION OF THE INVENTION

Figure 1:
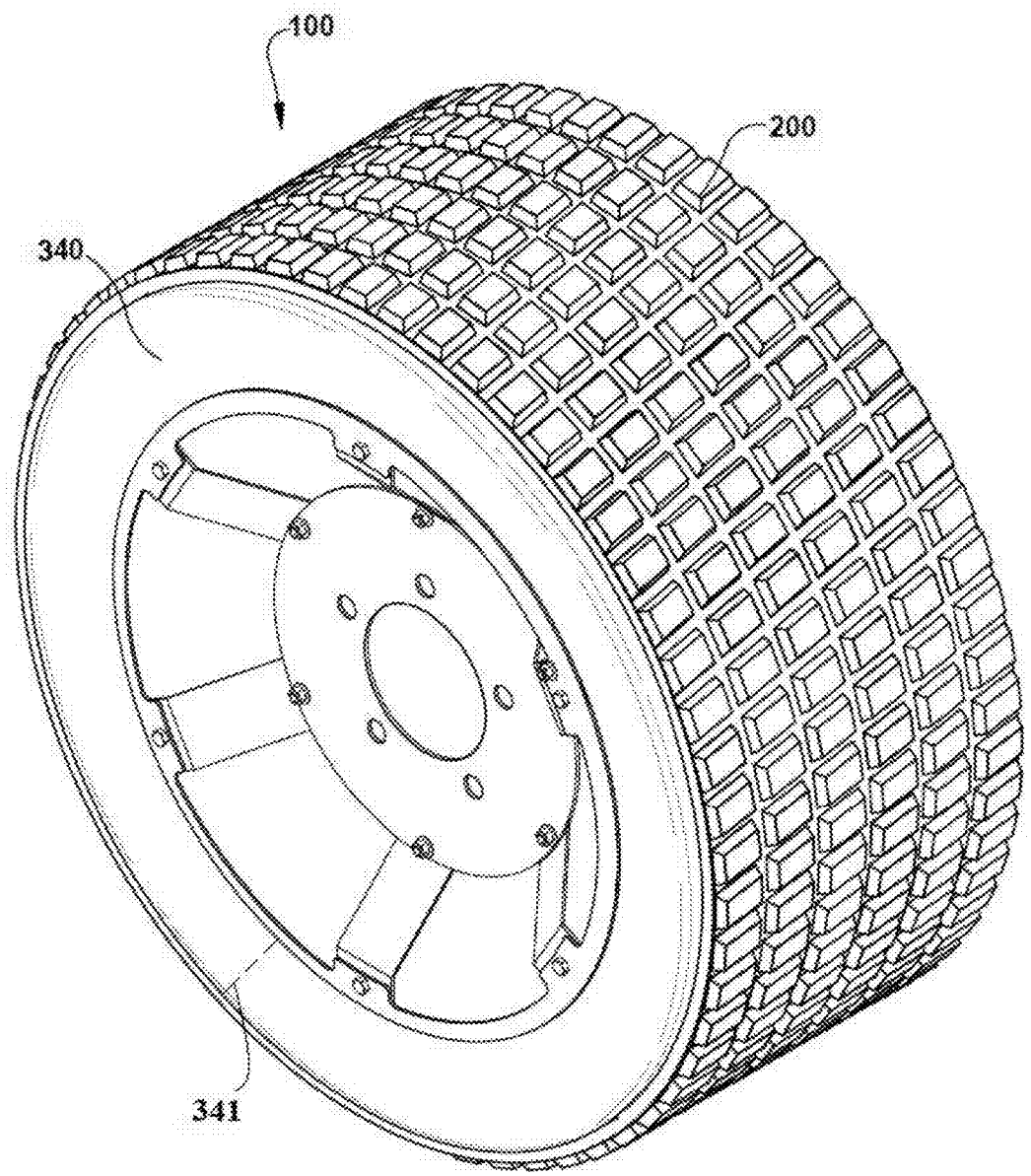
FIG. 1 is a perspective view of a first embodiment of a non-pneumatic tire and wheel assembly of the present invention.
Figure 2:
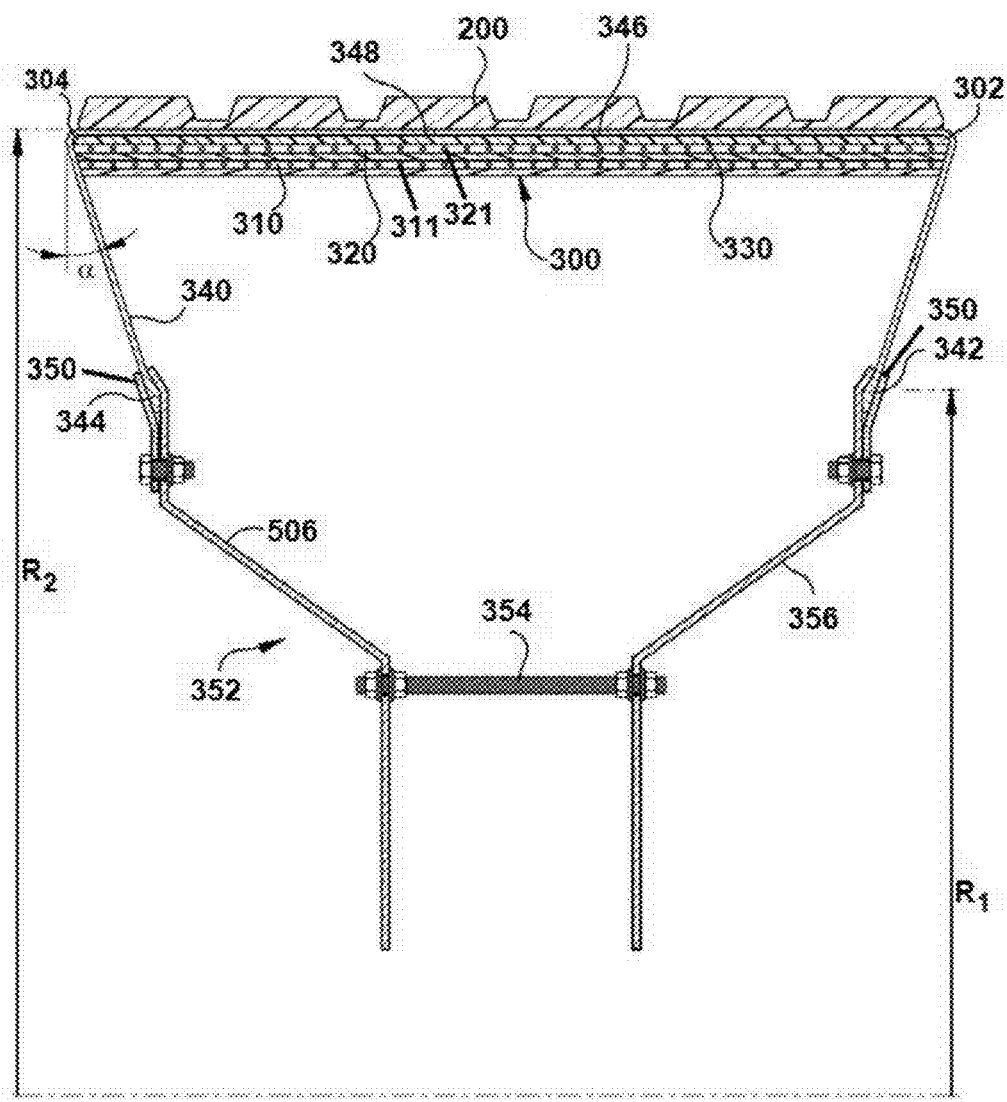
FIG. 2 is a cross-sectional view of the non-pneumatic tire and wheel assembly of FIG. 1.

A first embodiment of a non-pneumatic tire and wheel assembly 100 of the present invention is shown in the FIGS. 1-2. The non-pneumatic tire of the present invention includes a radially outer ground engaging tread 200, a shear band 300, and one or more reinforcement layers 400. The non-pneumatic tire of the present invention is designed to be a top loaded structure, so that the shear band 300 and the reinforcement layer 400 efficiently carries the load. The shear band 300 and the reinforcement layer 400 are designed so that the stiffness of the shear band is directly related to the spring rate of the tire. The reinforcement layer is designed to be a stiff structure that buckles or deforms in the tire footprint and does not compress or carry a compressive load. This allows the rest of structure not in the footprint area the ability to carry the load, resulting in a very load efficient structure. It is desired to minimize this load for the reason above and to allow the shearband to bend to overcome road obstacles. The approximate load distribution is such that approximately 95-100% of the load is carried by the shear band and the upper radial portion of the reinforcement layer 400, so that the lower portion of the reinforcement structure undergoing compression carries virtually zero of the load, and preferably less than 10%.

The tread portion 200 may be a conventional tread as desired, and may include grooves or a plurality of longitudinally oriented tread grooves forming essentially longitudinal tread ribs there between. Ribs may be further divided transversely or longitudinally to form a tread pattern adapted to the usage requirements of the particular vehicle application. Tread grooves may have any depth consistent with the intended use of the tire. The tire tread 200 may include elements such as ribs, blocks, lugs, grooves, and sipes as desired to improve the performance of the tire in various conditions.

Shear Band

The shear band 300 is preferably annular. A cross-sectional view of the shear band is shown in FIG. 2. The shear band 300 is located radially inward of the tire tread 200. The shear band 300 includes a first and second reinforced elastomer layer 310, 320. In a first embodiment of a shear band 300, the shear band is comprised of two inextensible reinforcement layers 310, 320 arranged in parallel, and separated by a shear matrix 330 of elastomer. Each inextensible layer 310, 320 may be formed of parallel inextensible reinforcement cords 311, 321 embedded in an elastomeric coating. The reinforcement cords 311, 321 may be steel, aramid, nylon, polyester or other inextensible structure. The shear band 300 may further optionally include a third reinforced elastomer layer (not shown) located between the first and second reinforced elastomer layers 310,320.

It is additionally preferred that the outer lateral ends 302,304 of the shear band be radiused in order to control the buckled shape of the sidewall and to reduce flexural stresses.

In the first reinforced elastomer layer 310, the reinforcement cords are oriented at an angle in the range of 0 to about +/−10 degrees relative to the tire equatorial plane. In the second reinforced elastomer layer 320, the reinforcement cords are oriented at an angle in the range of 0 to about +/−10 degrees relative to the tire equatorial plane. Preferably, the angle of the first layer is in the opposite direction of the angle of the reinforcement cords in the second layer.

The shear matrix 330 may have a radial thickness in the range of about 0.10 inches to about 0.2 inches, more preferably about 0.15 inches. The shear matrix is preferably formed of an elastomer material having a shear modulus $G_m$ in the range of 15 to 80 MPa, and more preferably in the range of 40 to 60 MPA.

The shear band has a shear stiffness GA. The shear stiffness GA may be determined by measuring the deflection on a representative test specimen taken from the shear band. The upper surface of the test specimen is subjected to a lateral force F as shown below. The test specimen is a representative sample taken from the shear matrix material, having the same radial thickness.

The shear stiffness GA is then calculated from the following equation:

$$GA = F*L/\Delta X$$

The shear band has a bending stiffness EI. The bending stiffness EI may be determined from beam mechanics using the three point bending test subjected to a test specimen representative of the shear band. It represents the case of a beam resting on two roller supports and subjected to a concentrated load applied in the middle of the beam. The bending stiffness EI is determined from the following equation: $EI=PL^3/48*\Delta X$, where P is the load, L is the beam length, and $\Delta X$ is the deflection.

It is desirable to maximize the bending stiffness EI of the shearband and minimize the shear band stiffness GA. The acceptable ratio of GA/EI would be between 0.01 and 20, with a preferred range between 0.01 and 5. EA is the extensible stiffness of the shear band, and it is determined experimentally by applying a tensile force and measuring the change in length. The ratio of the EA to EI of the shearband is acceptable in the range of 0.02 to 100 with a preferred range of 1 to 50. The shear band 300 preferably can withstand a maximum shear strain in the range of 15-30%.

The shear band 300 has a spring rate k that may be determined experimentally by exerting a downward force on a horizontal plate at the top of the shear band and measuring the amount of deflection as shown in FIG. 11a. The spring rate k is determined from the slope of the Force versus deflection curve, as shown in FIG. 11b.

The non-pneumatic tire has an overall spring rate $k_t$ that is determined experimentally. The non-pneumatic tire is mounted upon a rim, and a load is applied to the center of the tire through the rim. The spring rate $k_t$ is determined from the slope of the Force versus deflection curve. The spring rate $k_t$ is preferably in the range of 500 to 1000 for small low speed vehicles such as lawn mowers.

The invention is not limited to the shear band structure disclosed herein, and may comprise any structure which has a GA/EI in the range of 0.01 to 20, or a EA/EI ratio in the range of 0.02 to 100, or a spring rate $k_t$ in the range of 500 to 1000, as well as any combinations thereof. More preferably, the shear band has a GA/EI ratio of 0.01 to 5, or an EA/EI ratio of 1 to 50 and any subcombinations thereof. The tire tread is preferably wrapped about the shear band and is preferably integrally molded to the shear band.

Reinforcement Structure

The reinforcement structure 340 functions to carry the load transmitted from the shear layer. The reinforcement structure 340 is primarily loaded in tension and shear, and carries no load in compression. As shown in FIGS. 1 and 2, the reinforcement structure 340 has a first end 342, 344 that extends from a first radius $R_1$ to a second radius $R_2$ in order to form the non-pneumatic tire sidewall. At the first radius, the first end 342, 344 is clamped to a rim via clamp rings 350 connected to the rim, as shown in FIG. 2, without the need for a bead. The reinforcement layer extends radially outward of each first end 342, 344 and terminates in a respective second end 346, 348. As shown in FIG. 2, the reinforcement layer extends radially outward of the shear band 300 and terminates axially inward of the lateral edges 302, 304 of the shear band. Thus the sidewall may be formed from one or more reinforcement layers. The second end 346, 348 may optionally extend completely across the crown of the tire, although not required.

The reinforcement layer 340 may comprise any fabric or flexible structure such as nylon, polyester, cotton, rubber. Preferably, the reinforcement layer 340 comprises a reinforced rubber or ply layer formed of parallel reinforcements 341 that are nylon, polyester or aramid, as shown in FIG. 1. Preferably, the reinforcements are oriented in the radial direction. It is preferred that tire ply be used as a reinforcement layer for several reasons. First, tire ply is an ideal connecting structure for the non-pneumatic tire application because it is thin, and has a low bending stiffness with no resistance to compression or buckling. Tire ply has a high tensile stiffness and strength which is needed in the non-pneumatic tire application. Tire ply is also cheap, has a known durability, and is readily available. Furthermore, a continuous ply reinforcement layer eliminates debris which can be caught into spoke or web non-pneumatic tire designs, and does not contribute to tire noise or high frequency harmonics associated with discrete spokes.

The reinforcement layer 340 forming the sidewalls is preferably oriented so that it makes an angle α with respect to the radial direction, as shown in FIG. 2. The angle α can help pretension the reinforcement 400 and also increase and tune the lateral stiffness of the tire. This results in a non-pneumatic tire having angled sidewalls. The angle α is measured with respect to the radial direction, and may be -10 to 45 degrees, and more preferably, 0 to 45 degrees, and even more preferably 10-25 degrees as measured with respect to the radial direction. The angle α can be tuned as desired using an axial adjustment feature 354 of the rim. The rim 352, 356 may be axially adjusted to narrow or expand the axial rim width. This axial adjustment controls the ply tension, allowing the tire lateral stiffness to be adjusted independent of the radial stiffness. The rim may be axially adjusted by a tensioning member or bolt 354 that is mounted in the opposed rim parallel walls 356, 358. The clamp rings 350 are secured to the outer end of the rim walls 356, 358. Alternatively, the angle a may be adjusted by the radial length of the sidewalls.

Figure 3:
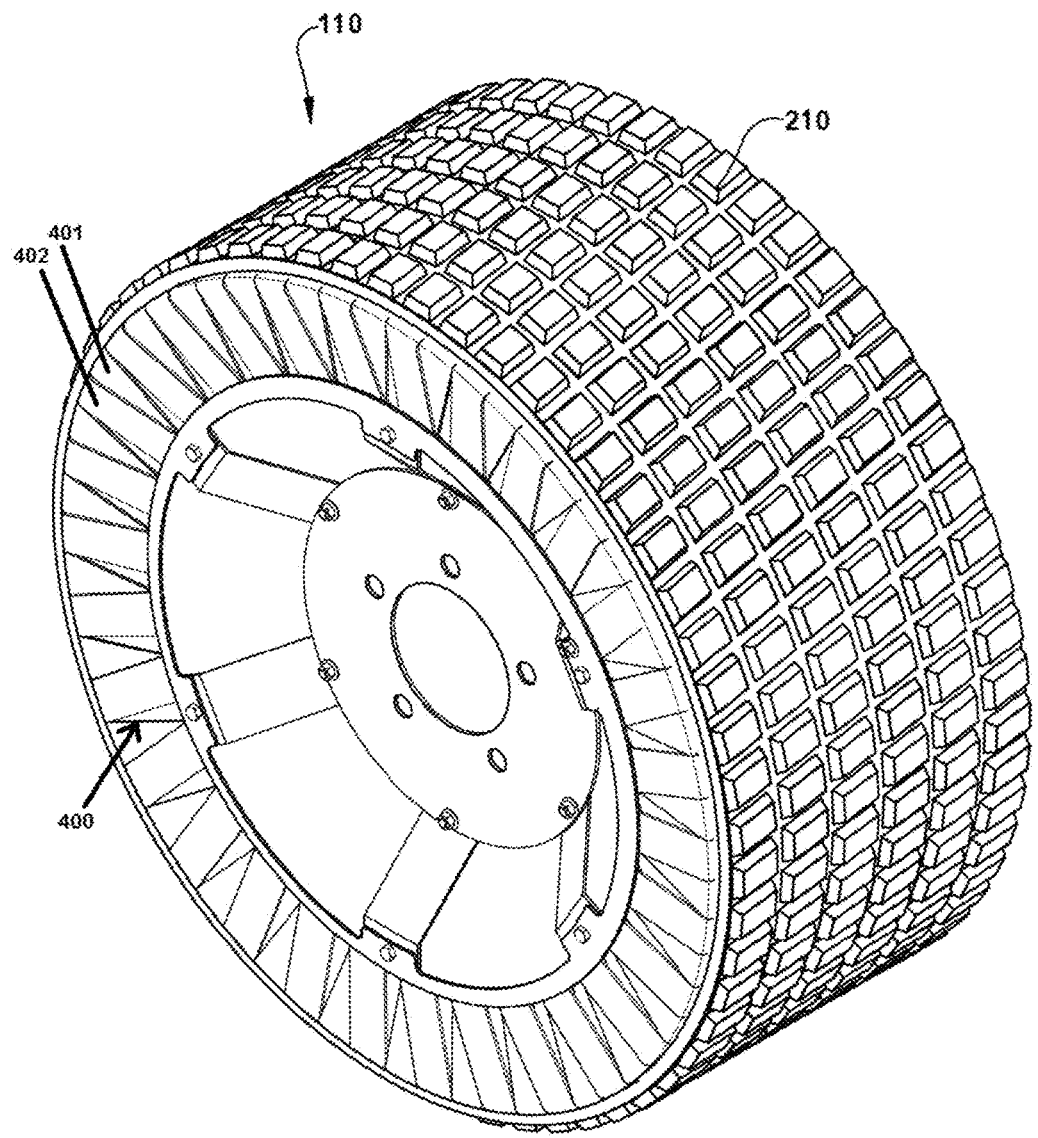
FIG. 3 is a perspective view of a second embodiment of a non-pneumatic tire and wheel assembly of the present invention.
Figure 4:
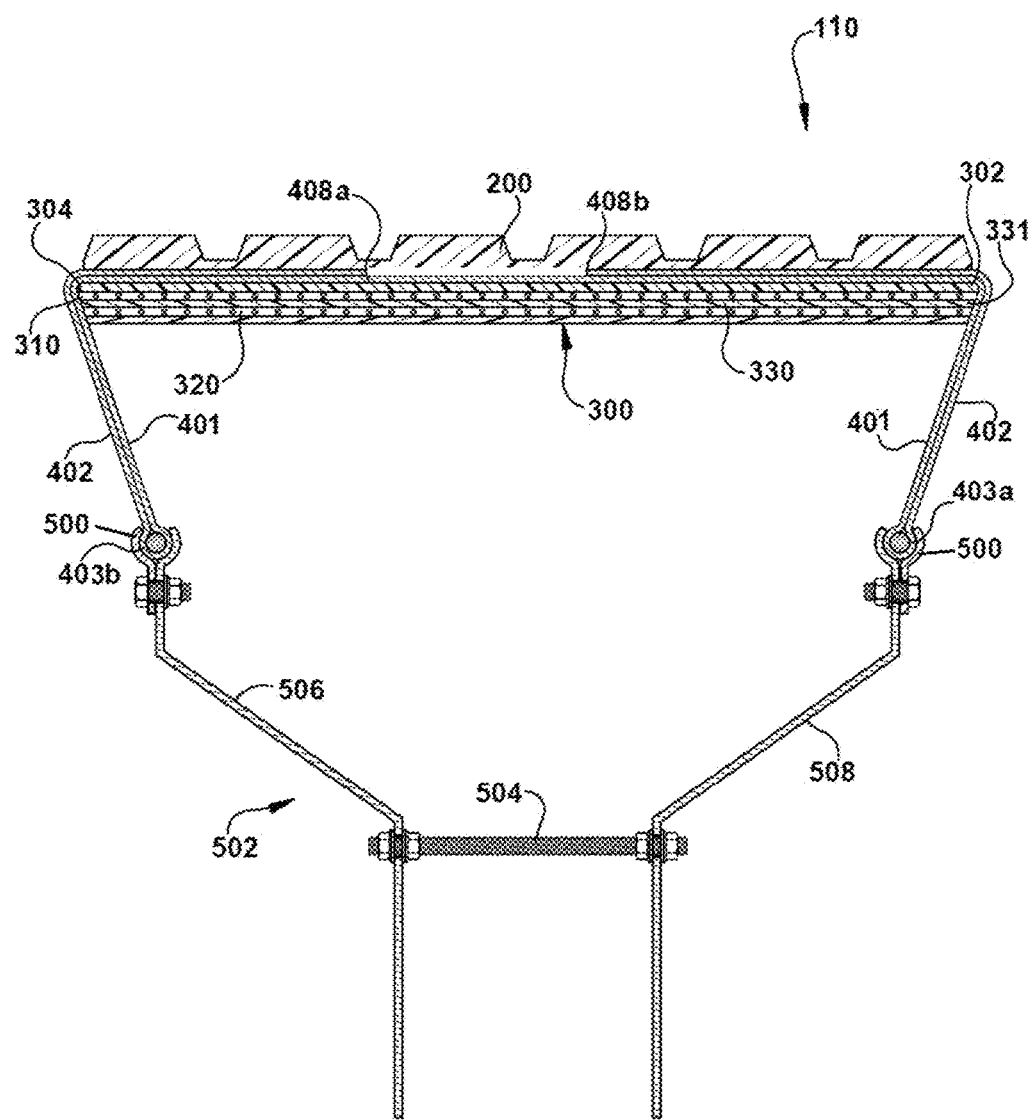
FIG. 4 is a cross-sectional view of the non-pneumatic tire and wheel assembly of FIG. 3.
Figure 5:
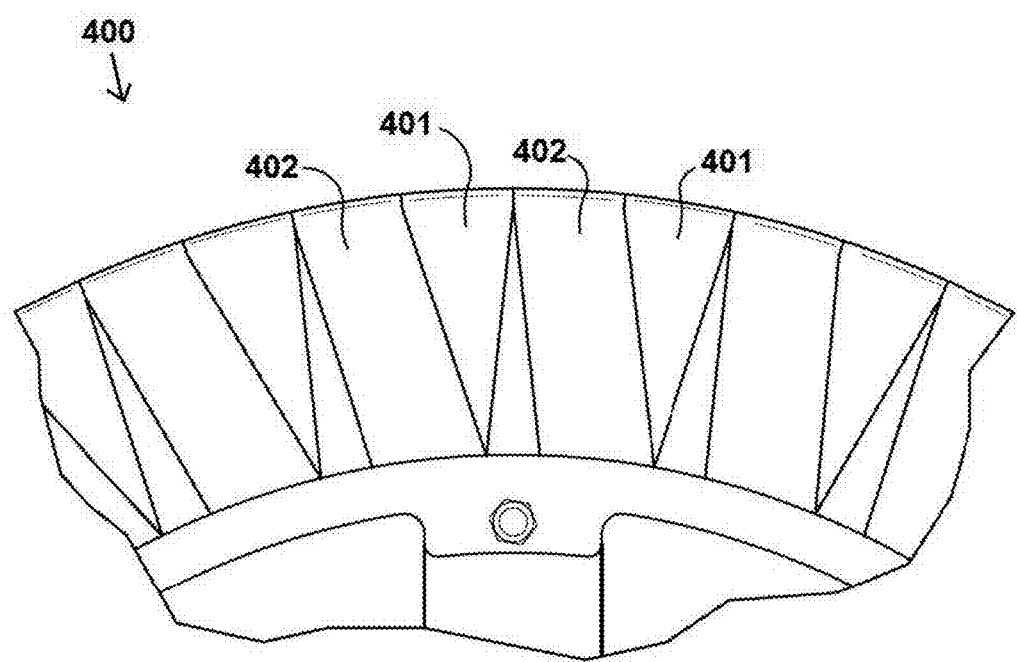
FIG. 5 is a close up side view of the tire of FIG. 3 having geodesic ply spokes.
Figure 6:
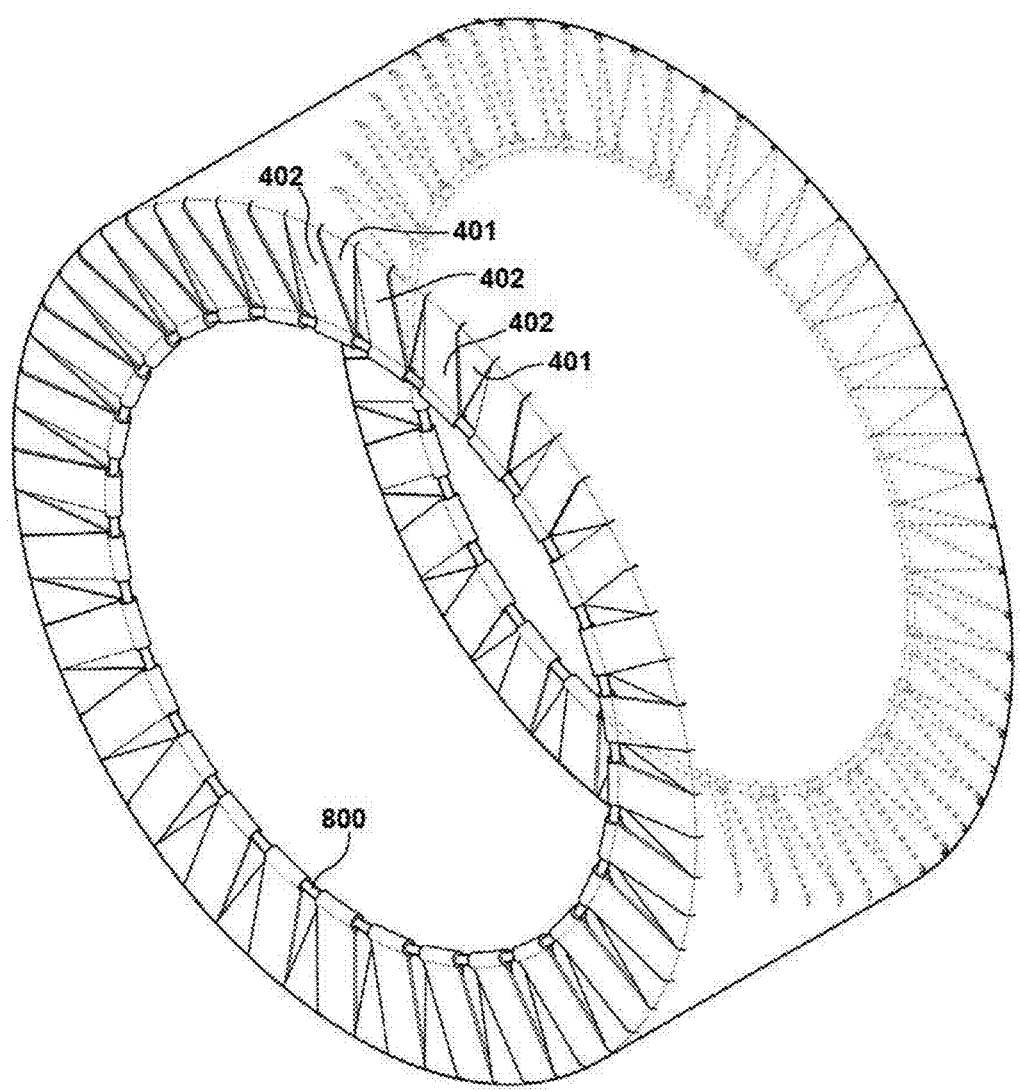
FIG. 6 is a perspective view of only the geodesic ply spokes.
Figure 8A:
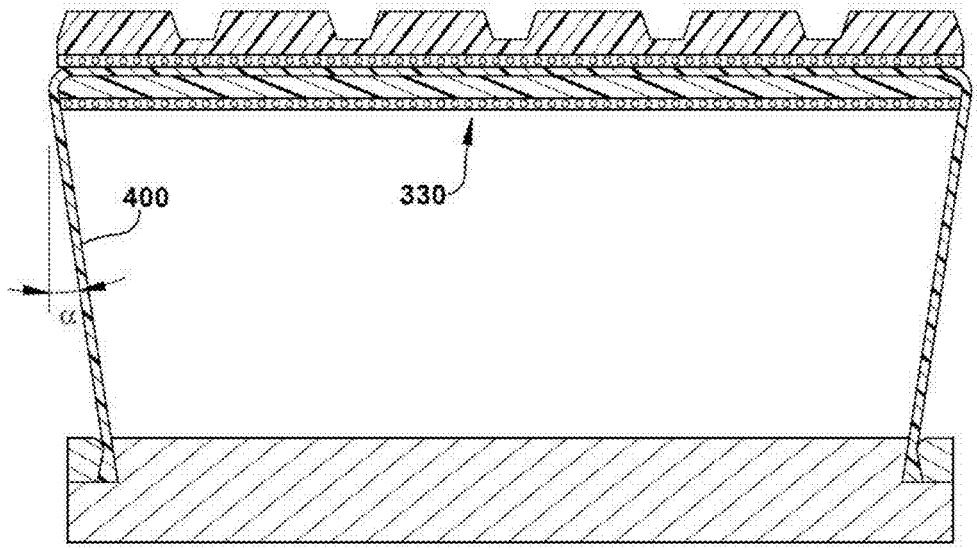
FIG. 8a is a cross-sectional view of the invention showing the ply positioned in the shear band between the reinforcement layers of the shear band.
Figure 8B:
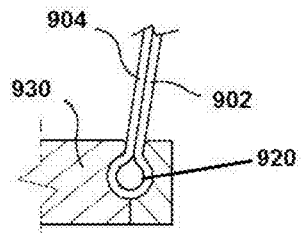
FIG. 8B illustrates an alternate embodiment of the ply clamped around an optional elastic member.

FIGS. 3-6 illustrate a second embodiment of the invention wherein the reinforcement layer 400 is formed by a plurality of strips 401, that are preferably geodesic, and more preferably the strips are oriented in the radial direction. The strips are preferably about 0.25 to 0.5 inches wide. Each strip preferably includes one or more parallel reinforcements, such as nylon, polyester or aramid reinforcements which are preferably oriented in the radial direction when mounted on the tire. The strips may be arranged in a single reinforcement layer or, the strips may overlap as shown in FIG. 5. The reinforcement structure 400 may comprise two or more layers of reinforcement strips. As shown in FIGS. 3-5, the reinforcement structure has a first inner layer 401 that extends completely (axially) across the crown portion of the tire, and is located radially outward of the shear band 300. The inner layer 401 extends radially inward and forms a looped end 403a, b that is clamped or secured to the rim, wherein the reinforcement layer structure forms a second layer 402 that extends radially outward of the rim clamps and then radially outward of the shear band terminating in folded over ends 408a, b. Thus the sidewalls are formed of a dual layer of reinforcement. An optional flexible o-ring or flexible rubber band 800 may be used to form the looped end, as shown in FIG. 6, wherein the flexible o-ring 800 and ply ends are then securing to rim clamps 500 as shown in FIG. 8b.

Alternatively, the reinforced ply strip may be continuously wound from one side of the tire to the other in order to form a plurality of geodesic ply spokes. The reinforced strips are wound in a continuous manner so that the geodesic ply spokes extend from the inner radius R1 to the outer radius R2, as shown in FIG. 8a. Preferably, the ply spokes are oriented in the radial direction. The reinforced strip may optionally extend over the full axial width of the crown and then radially inward to form the other sidewall. The ply spokes or strip are preloaded in tension.

Alternatively, the first end 402a, b may be wound around a portion of the rim, or otherwise secured or fastened to the outer radial portion of the rim.

Figure 7:
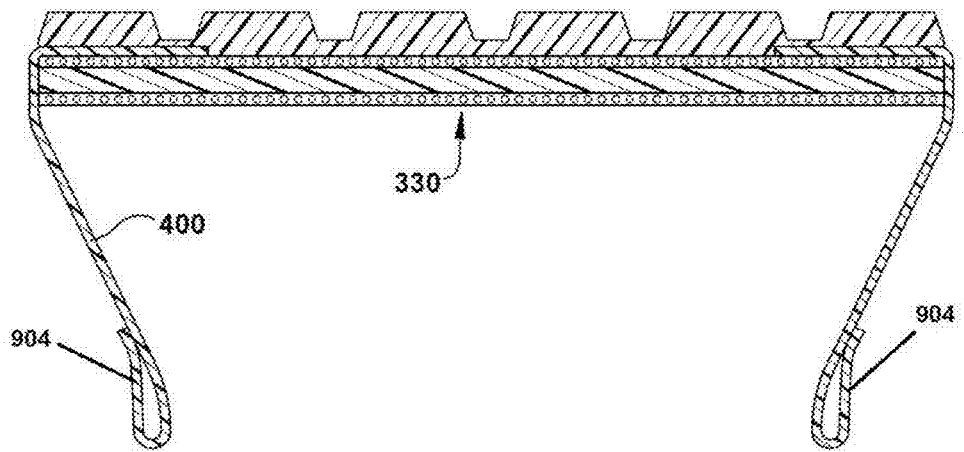
FIG. 7 is a side view of a third embodiment of the invention with geodesic ply spokes having a turnup.

Alternatively, the first end of the ply strip 902 may be looped around a portion of the rim and secured to the down portion of the ply forming a looped end 904 or beadless turnup as shown in FIG. 7. The looped end may be received in clamps 930 and may further include an optional annular flexible member 920 mounted on the rim. The optional flexible member 920 may be an o-ring or flexible rubber band, which may be included to facilitate the mounting of the reinforcement structure on the rim clamp as shown in FIG. 8b. Thus the invention has eliminated the need for a bead or annular tensile member, which reduces the weight, cost and complexity of the design.

Figure 9:
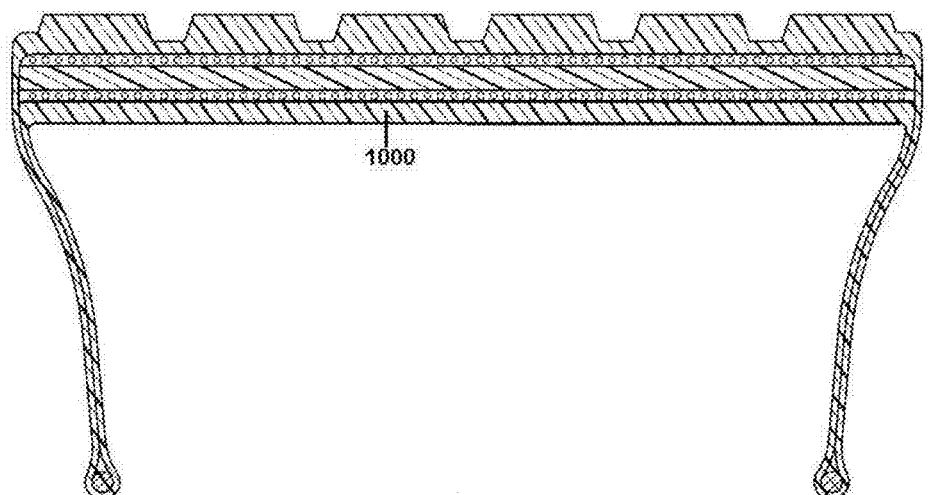
FIG. 9 illustrates a fourth embodiment of the invention.
Figure 10:
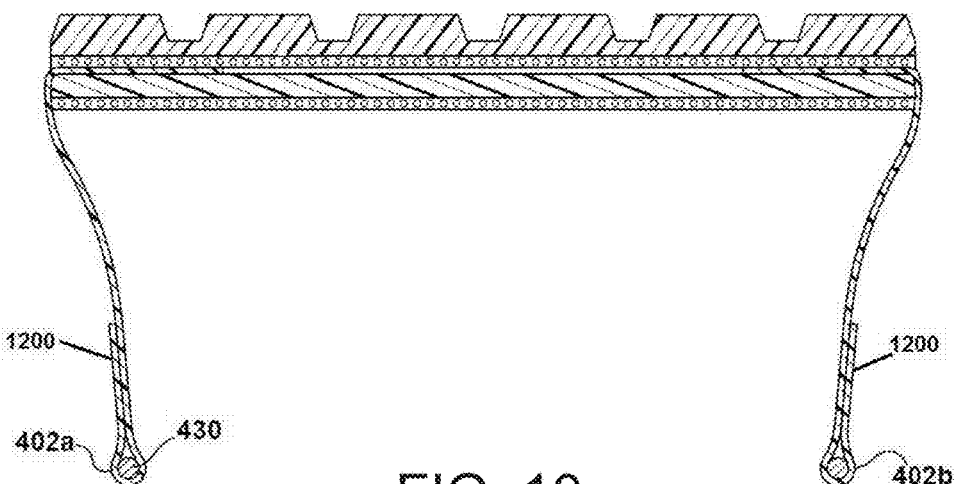
FIG. 10 is a cross-sectional view of the invention showing ply spokes embedded in the shear band.

The reinforcement structure 1000 need not be positioned radially outward of the shear band. The reinforcement structure 1000 may be positioned radially inward of the shear band as shown in FIG. 9. Alternatively, a portion of the reinforcement layer may even be positioned between the reinforcement layers of the shear band, as shown in FIG. 10. However, it is advantageous to locate the reinforcement layer radially outward of the shear band because it eliminates the tensile stress on the bond between the shear band and load carrying member or connecting structure. This advantage is especially important when the shear band and the play are dissimilar materials.

Alternatively as shown in FIG. 10, a first end 1100 of a ply spoke may terminate in the crown portion of the tire and in the shear band, and the terminal end 1200 of the ply spoke may partially extend up the sidewall of the tire.

Applicants understand that many other variations are apparent to one of ordinary skill in the art from a reading of the above specification. These variations and other variations are within the spirit and scope of the present invention as defined by the following appended claims.

What is claimed:

1. A non-pneumatic tire and wheel assembly comprising: a ground contacting annular tread positioned radially outward of a shear band; a reinforcement layer positioned radially inward of the tread, said reinforcement layer being formed of one or more strips oriented in a geodesic path, wherein a radially inner end of the one or more strips is clamped to a wheel rim without the use of a bead, and a radially outer end of the one or more strips is secured between the tread and a shear band.

2. The non-pneumatic tire and wheel assembly of claim 1 wherein the one or more strips are oriented in the radial direction.

3. The non-pneumatic tire and wheel assembly of claim 1 wherein the non-pneumatic tire is mounted on a rim of the wheel, wherein the rim is axially adjustable.

4. The non-pneumatic tire and wheel assembly of claim 1 wherein the reinforcement layer makes an angle $\alpha$ with the radial direction.

5. The non-pneumatic tire and wheel assembly of claim 4 wherein the angle $\alpha$ is in the range of −20 to +20 degrees.

6. The non-pneumatic tire and wheel assembly of claim 1 wherein each strip has one or more parallel reinforcements.

7. The non-pneumatic tire and wheel assembly of claim 1 wherein the first end of the reinforcement layer is secured to a clamp mounted on a rim.

8. The non-pneumatic tire and wheel assembly of claim 1 wherein a second end of the reinforcement layer is positioned radially outward of the shear band.

9. The non-pneumatic tire and wheel assembly of claim 1 wherein the strip is made of an elastomer with one or more parallel reinforcements.

10. A non-pneumatic tire and wheel assembly comprising: a ground contacting annular tread; a shear band; a reinforcement layer formed of a plurality of strips of fabric extending between a first radius and a second radius, wherein a first end of the reinforcement layer is positioned radially outward of the shear band, and a second end of the reinforcement layer is secured to the rim without the use of a bead.

11. The non-pneumatic tire and wheel assembly of claim 10 wherein each strip further includes one or more reinforcements.

12. The non-pneumatic tire and wheel assembly of claim 11 wherein each of said plurality of strips is oriented in a geodesic path.

13. A non-pneumatic tire and wheel assembly comprising:
a ground contacting annular tread;
a shear band; and
a reinforcement layer of fabric positioned radially inward of the tread, said reinforcement layer having a first end which extends radially inward and is secured to a first clamp, said reinforcement layer having a second end which extends radially inward and is secured to a second clamp, wherein the first clamp is connected to a first wall, and the second clamp is connected to a second wall, wherein the axial spacing between said first and second walls is axially adjustable the full width of the axial spacing.

14. The non-pneumatic tire and wheel assembly of claim 13, wherein the first and second ends of the reinforcement layer are oriented an angle $\alpha$ with respect to the radial direction in the range of −10 to 45 degrees.

15. The non-pneumatic tire and wheel assembly of claim 14, wherein the angle $\alpha$ is adjustable by adjusting the axial spacing of the first and second walls.

* * * * *